United States Patent
Nagaoka et al.

(10) Patent No.: US 7,963,103 B2
(45) Date of Patent: Jun. 21, 2011

(54) EXHAUST GAS PURIFICATION METHOD AND SYSTEM

(75) Inventors: Daiji Nagaoka, Fujisawa (JP); Masashi Gabe, Fujisawa (JP)

(73) Assignee: Isuzu Motors Limited, Tokyo (JP)

( * ) Notice: Subject to any disclaimer, the term of this patent is extended or adjusted under 35 U.S.C. 154(b) by 938 days.

(21) Appl. No.: 11/885,407

(22) PCT Filed: Feb. 14, 2006

(86) PCT No.: PCT/JP2006/302492
§ 371 (c)(1), (2), (4) Date: Aug. 30, 2007

(87) PCT Pub. No.: WO2006/098104
PCT Pub. Date: Sep. 21, 2006

(65) Prior Publication Data
US 2009/0235646 A1 Sep. 24, 2009

(30) Foreign Application Priority Data

Mar. 16, 2005 (JP) .................... 2005-074431

(51) Int. Cl.
*F01N 3/00* (2006.01)
*F01N 3/10* (2006.01)
(52) U.S. Cl. ............... 60/286; 60/285; 60/295; 60/301
(58) Field of Classification Search ............ 60/285, 60/301, 295, 286
See application file for complete search history.

(56) References Cited

U.S. PATENT DOCUMENTS

2005/0223697 A1* 10/2005 Onodera et al. ............... 60/278
2005/0223698 A1* 10/2005 Murata et al. .................. 60/286

FOREIGN PATENT DOCUMENTS

| JP | 06-336916 | 12/1994 |
| JP | 11-294145 | 10/1999 |
| JP | 2003-90211 | 3/2003 |
| JP | 2003-201828 | 7/2003 |
| JP | 2003-201831 | 7/2003 |
| JP | 2004-239136 | 8/2004 |

OTHER PUBLICATIONS

International Search Report of International Published Application No. PCT/JP2006/302492 (mailed May 30, 2006).
Patent Abstracts of Japan, Publication No. 06-336916, Published Dec. 6, 1994.
Patent Abstracts of Japan, Publication No. 2004-239136, Published Aug. 26, 2004.

* cited by examiner

*Primary Examiner* — Thomas E Denion
*Assistant Examiner* — Michael Carton
(74) *Attorney, Agent, or Firm* — Staas & Halsey LLP

(57) ABSTRACT

In regeneration control of an exhaust gas purification system (1) equipped with NOx occlusion reduction catalyst (11), a decision is made whether operating state of an engine is in a first engine operating range where the exhaust gas temperature is lower than a predetermined mode judgment temperature. If yes, EGR rich control is performed. Otherwise, injection rich control in exhaust pipe is performed. When EGR rich control is performed, a decision is made whether a vehicle is under acceleration or not. If a decision is made that the vehicle is under acceleration, regeneration control is postponed until that decision ends. This enables rich control for regeneration the NOx occlusion reduction catalyst (11), while avoiding deterioration in drivability (comfortableness) during acceleration of the vehicle.

6 Claims, 6 Drawing Sheets

EXHAUST GAS PURIFICATION METHOD AND SYSTEM

This application claims the benefit under 35 U.S.C. §371, of PCT International Application No. PCT/JP2006/302492, filed Feb. 14, 2006, and Japanese Application No. 2005-074431 filed Mar. 16, 2005 respectively in Japan, the contents of which are incorporated herein by reference.

FIELD OF THE INVENTION

The present invention relates to an exhaust gas purification method and an exhaust gas purification system, comprising a NOx occlusion reduction type catalyst that reduces and thereby purifies NOx (nitrogen oxide) in exhaust gas from an internal combustion engine.

DESCRIPTION OF THE RELATED ART

There have been differently studied and proposed NOx catalysts for reducing and removing NOx (nitrogen oxide) in exhaust gas from internal combustion engines including diesel engines and some of gasoline engines, and from various combustion devices. One of them includes a NOx occlusion reduction type catalyst as a NOx reduction catalyst for a diesel engine. Using the NOx occlusion reduction type catalyst enables NOx in the exhaust gas to be effectively purified.

The NOx occlusion reduction type catalyst is formed of a monolithic honeycomb, or the like. In a carrier made from a structural material formed of a monolithic honeycomb cordierite or stainless steel, a large number of polygonal cells are formed. A wall surface of the cell is provided with a porous catalyst coat layer made of alumina ($Al_2O_3$) or zeolite, which is to be a catalyst carrier layer. A surface of the catalyst coat layer carries a carried noble metal (catalytically active metal) having an oxidation function and a NOx occlusion material (NOx occlusion substance: NOx occlusion agent: NOx absorbent) having a NOx occlusion function. The carried noble metal includes platinum (Pt) or the like. Also, the NOx occlusion material is made of some of alkali metals such as potassium (K), sodium (Na), lithium (Li), and cesium (Cs) or the like, alkali earth metals such as barium (Ba) and calcium (Ca) or the like, and rare earth metals such as lanthanum (La) and yttrium (Y) or the like. Such a configuration allows two functions, i.e., NOx occlusion and NOx release/purification, to be fulfilled depending on an oxygen concentration in the exhaust gas.

Further, the NOx occlusion reduction type catalyst makes the catalyst metal occlude NOx during normal operation. Also, as an occluding ability approaches saturation, an air/fuel ratio of the exhaust gas flowing in is brought into a rich air/fuel ratio condition at the right time to release the occluded NOx and reduce the released NOx with the aid of three-way catalyst functions.

More particularly, if the air/fuel ratio of the exhaust gas is in a lean air/fuel ratio state, for example, in a condition where oxygen ($O_2$) is contained in the exhaust gas from a normal diesel engine, a lean-burn gasoline engine, or the like, the oxygen contained in the exhaust gas oxidizes nitric monoxide (NO) exhausted from the engine into nitrogen dioxide ($NO_2$) with the aid of the oxidation catalytic function of the carried noble metal. Then, the NOx occlusion material having the NOx occlusion function, such as barium, occludes the nitrogen dioxide in the form of nitrate to thereby purify NOx.

However, if such a condition continues, the NOx occlusion material having the NOx occlusion function is entirely transformed into the nitrate, resulting in the loss of the NOx occlusion function. To overcome such a problem, by switching an operating condition of the engine, or by injecting fuel into an exhaust passage, over-rich combustion exhaust gas (rich spike gas) is made and then sent to the catalyst. The over-rich combustion exhaust gas is exhaust gas containing no oxygen and having higher carbon monoxide (CO) concentration and higher exhaust temperature.

If gas is exhausted in the rich air/fuel ratio condition where the exhaust gas contains no oxygen and has higher carbon monoxide concentration and elevated exhaust gas temperature, the nitrate occluding the NOx releases the nitrogen dioxide and then returns to the original barium. The released nitrogen dioxide is reduced into nitrogen ($N_2$) for purification with the aid of the oxidation function of the carried noble metal by using carbon monoxide, carbon hydride (HC), and hydrogen ($H_2$) in the exhaust gas as reducing agents, because the exhaust gas contains no oxygen.

For such a purpose, for example, as described in Japanese Patent Application Kokai Publication No. 1994-336916, an exhaust gas purification system comprising a NOx occlusion reduction type catalyst performs a rich control for recovering a NOx occluding ability, in which an oxygen concentration in exhaust gas flowing in is reduced by bringing an air/fuel ratio of the exhaust gas into a rich condition when a NOx occlusion amount is estimated to be saturated, to thereby release the occluded NOx, and performs a regeneration operation in which the released NOx is reduced with the aid of a noble metal catalyst.

In the regeneration control for recovering the NOx occluding ability of the NOx occlusion reduction type catalyst, the air/fuel ratio of the exhaust gas flowing in is required to be a theoretical air/fuel ratio or less. However, because of an oxygen-excessive condition in normal diesel combustion, it is necessary to reduce an air amount by EGR and/or increase a fuel amount in order to attain the rich air/fuel ratio condition where almost no oxygen is contained.

The rich control is classified into air-intake system rich control and fuel system rich control. The air-intake system rich control is further classified into rich control in which taking in EGR gas by opening an EGR valve allows an additional air amount to be reduced, rich control in which throttling an air-intake valve allows an additional air amount to be reduced, and others. Also, the fuel system rich control is further classified into cylinder injection rich control by post injection or the like in a cylinder injection process, and exhaust pipe injection rich control in which fuel is directly supplied into an exhaust pipe. Note that the present invention employs EGR rich control in which the EGR valve is opened and the air-intake valve is simultaneously throttled to take in a more amount of EGR gas.

Normally, at an exhaust gas temperature of approximately 300° C. or below, the EGR rich control is performed for the reason that a deterioration in fuel efficiency due to an increase in a fuel amount can be prevented, and for other reasons. The EGR rich control is the control that reduces an air amount by re-circulating a large amount of EGR gas, to thereby bring the exhaust gas into the rich air/fuel ratio condition, and can be performed only in a low load range where even if exhaust gas temperature is lower and a large amount of EGR gas is re-circulated, black smoke is less degraded.

Also, in an exhaust gas temperature range exceeding approximately 300° C., the rich control is performed based on the exhaust pipe injection rich control for the reasons that the rich control by the large amount of EGR cannot be performed due to the degradation of black smoke if the exhaust gas temperature is elevated, a dilution problem of engine oil with fuel due to the post injection can be prevented, and the exhaust gas temperature has already reached temperature at which fuel by exhaust pipe injection can be gasified, and for other reasons.

However, if an engine is in a low speed/low load operating region, and the exhaust gas temperature is lower, the EGR rich control is performed. However, as shown in FIG. 5, if the EGR rich control is performed during acceleration of a vehicle mounted with the engine even if the exhaust gas temperature is lower, the engine speed Ne fluctuates during a rich control time period tr. That is, hunting in the engine speed Ne occurs. For this reason, there exist problems that defective acceleration and a reduction in accelerating rate due to the defective acceleration occur. In addition, Reference symbols "Mac", "Tgin", and "Td" in FIG. 5 represent a control signal in an operating mode, an exhaust gas temperature at a catalyst inlet, and a catalyst temperature, respectively.

The cause of the problems is as follows: In a case of a diesel engine, combustion is normally performed in an oxygen-excessive condition, so that engine torque control is performed based only on a fuel flow rate. However, the air/fuel ratio during the rich control becomes the theoretical air/fuel ratio and thereby an amount of oxygen contributing to the combustion becomes smaller, so that torque for accelerating the vehicle is not generated even if the fuel amount is increased.

Further, there also exists a problem that the black smoke may be degraded during acceleration because the fuel amount is increased relative to the oxygen amount that is smaller due to the rich control.

In addition, in the exhaust gas temperature range exceeding approximately 300° C., the rich control is performed based on the exhaust pipe injection rich control. Accordingly, as shown in FIG. 6, the engine speed Ne does not significantly undulate and the fluctuation in the engine speed Ne is also small during the rich control time period, and thereby the defective acceleration does not occur. Consequently, the above problems in the EGR rich control do not arise.

For example, in association with the rich control during acceleration, there has been proposed a method of controlling fuel injection for an engine equipped with an exhaust gas purifying system as described in Japanese Patent Application Kokai Publication No. 2004-239136. The method retards main injection timing in fuel injection only during acceleration when an engine operating condition is brought into a rich condition to regenerate a NOx occlusion reduction type catalyst. This allows a NOx occluding ability of the NOx occlusion reduction type catalyst to be recovered, so that generation of smoke can be reduced without stopping the rich state even if the rich condition and acceleration overlap with each other when the rich condition is introduced, and also a deterioration in fuel efficiency can be suppressed.

SUMMARY OF THE INVENTION

The present invention is made to solve the above-described problems in a manner different from the retard of the main injection timing. An object of the present invention is to provide an exhaust gas purification method and an exhaust gas purification system capable of bringing an air/fuel ratio of exhaust gas into a rich state and regenerating a NOx occlusion reduction type catalyst while preventing drivability (riding comfortability) from deteriorating during acceleration of a vehicle, at the time of a rich control for regenerating the NOx occlusion reduction type catalyst in the exhaust gas purification system employing the NOx occlusion reduction type catalyst for purifying NOx in the exhaust gas.

The exhaust gas purification method to accomplish the above object is characterized by comprising: in regeneration control of an exhaust gas purification system that comprises a NOx occlusion reduction type catalyst that occludes NOx when an air/fuel ratio of exhaust gas is in a lean state, and releases and reduces occluded NOx when it is in a rich state, and performs the regeneration control for recovering a NOx occluding ability of the NOx occlusion reduction type catalyst if it is determined that an estimated NOx occlusion amount that is estimated to be occluded in the NOx occlusion reduction type catalyst reaches a predetermined criterion value, determining whether or not an engine operating condition is in a first engine operating region where an exhaust gas temperature becomes equal to or less than a predetermined mode determination temperature, and if the engine operating condition is in the first engine operating region, performing EGR rich control in which the air/fuel ratio of the exhaust gas is brought into the rich state by controlling an EGR amount, or if the engine operating condition is not in the first engine operating region, performing exhaust pipe injection rich control in which the air/fuel ratio of the exhaust gas is brought into the rich condition by directly injecting fuel into an exhaust pipe; determining whether or not a vehicle mounted with the exhaust gas purification system is in acceleration if the EGR rich control is performed; and postponing the regeneration control until a determination that the vehicle is in acceleration is complete, if it is determined that the vehicle is in acceleration.

The determination whether or not the engine operating condition is in the first engine operating region where the exhaust gas temperature is equal to or less than the predetermined mode determination temperature (e.g., approximately 300° C.) is made based on whether or not a measured exhaust gas temperature is equal to or less than the predetermined mode determination temperature. Alternatively, it may be made to compare an engine operating condition for control, which is set for driving, or a detected engine operating condition, with a map data. The map data is input in a control device, in which engine operating conditions (engine speed, loads, etc.) under the condition that the exhaust gas temperature is equal to or less than the predetermined mode determination temperature have been preliminarily set through experiments, or the like.

Also, the determination whether or not the vehicle mounted with the exhaust gas purification system is in acceleration, i.e., the determination of acceleration is made based on any one of or a combination of some of an increasing amount of a fuel flow rate per unit time, an accelerator pedaling acceleration, a rise in the engine speed, a rise in catalyst temperature, etc.

Further, in the present invention, it is determined whether or not the engine operating condition is in the first engine operating region where the exhaust gas temperature is equal to or less than the predetermined mode determination temperature. If the engine operating condition is in the first engine operating region, and the EGR rich control is performed, and also if it is determined that the vehicle is in an acceleration condition, a rich control based on the EGR rich control is postponed, i.e., the rich control is not performed. In other words, the request of the rich control is suspended, and the rich control is not performed until the vehicle becomes in a steady running condition after the determination of the acceleration condition based on the above determination has been complete.

This allows the EGR rich control to be bypassed, during acceleration during which the engine speed fluctuates and prevents drivability (riding comfortability) from deteriorating.

Also, the above-described exhaust gas purification method is characterized by further comprising: performing a combined rich control in which the EGR rich control and the exhaust pipe injection rich control are combined, if it is determined that the vehicle is in acceleration, a NOx conversion efficiency by the NOx occlusion reduction type catalyst is equal to or less than a predetermined conversion efficiency, and the exhaust gas temperature is equal to or more than a lower limit temperature threshold for exhaust pipe injection.

That is, in the above-described exhaust gas purification method, the lower limit temperature threshold (e.g., approximately 200° C.) for the exhaust gas temperature is further set, in consideration of a case where the regeneration control has to be performed because of a deterioration in a NOx conversion efficiency, or the like. At the temperature threshold or higher, the combined rich control is performed, in which the EGR rich control and the exhaust pipe injection rich control are combined. The lower limit temperature threshold is a lower temperature limit below which white smoke is generated if the exhaust pipe injection rich control is performed, and approximately 200° C.

In the combined rich control performed during acceleration, a target air-intake flow rate (target air excess ratio) under the EGR rich control is set to a value higher than that under normal rich control for steady running. A value of the target air-intake flow rate should be a value in a range where black smoke is not degraded because of combustion in a cylinder, and any problem in acceleration does not arise. However, the rich air/fuel ratio cannot be attained only through this, so that by performing the exhaust pipe injection rich control in tandem, the rich air/fuel ratio is attained.

In the exhaust pipe injection rich control, the injection is made not into the cylinder but into the exhaust pipe, so that an amount of black smoke is not increased. Also, the EGR rich control allows the air/fuel ratio of the exhaust gas to be reduced, so that the exhaust pipe injection requires only a smaller fuel injection amount. Further, the fuel injected into the exhaust pipe in which the exhaust gas temperature is higher than the lower limit temperature threshold is gasified. For this reason, consumption of the exhaust gas is facilitated with the aid of a reductive reaction, so that the white smoke as unburned HC emission can be prevented from being generated, and a deterioration in fuel efficiency can also be suppressed.

Also, the combined rich control in which the EGR rich control and the exhaust pipe injection rich control are combined, is not adapted to be performed at the exhaust gas temperature lower than the lower limit temperature threshold, which is set based on an activation temperature of light oil (approximately 200° C.), or the like, to thereby prevent the white smoke due to unburned HC emission from being generated.

Accordingly, it can expand a range where the regeneration control can be performed during acceleration, while preventing the deterioration in drivability, and the generation of black smoke and white smoke during acceleration, to thereby effectively regenerate the NOx occlusion reduction type catalyst.

Alternatively, the exhaust gas purification method to accomplish the above object may be characterized by comprising: in regeneration control of an exhaust gas purification system that comprises a NOx occlusion reduction type catalyst that occludes NOx when an air/fuel ratio of exhaust gas is in a lean state, and releases and reduces occluded NOx when it is in a rich state, and performs the regeneration control for recovering a NOx occluding ability of the NOx occlusion reduction type catalyst if it is determined that an estimated NOx occlusion amount that is estimated to be occluded in the NOx occlusion reduction type catalyst reaches a predetermined criterion value, determining whether or not an engine operating condition is in a first engine operating region where an exhaust gas temperature becomes equal to or less than a predetermined mode determination temperature, and if the engine operating condition is in the first engine operating region, performing EGR rich control in which the air/fuel ratio of the exhaust gas is brought into the rich state by controlling an EGR amount, or if the engine operating condition is not in the first engine operating region, performing exhaust pipe injection rich control in which the air/fuel ratio of the exhaust gas is brought into the rich state by directly injecting fuel into an exhaust pipe; determining whether or not a vehicle mounted with the exhaust gas purification system is in acceleration if the EGR rich control is performed; and performing a combined rich control in which the EGR rich control and the exhaust pipe injection rich control are combined, if it is determined that the vehicle is in acceleration, and the exhaust gas temperature is equal to or more than a lower limit temperature threshold for exhaust pipe injection, or postponing the regeneration control if it is determined that the vehicle is in acceleration, and the exhaust gas temperature is less than the lower limit temperature threshold for exhaust pipe injection.

Similarly to the previously mentioned exhaust gas purification system, this exhaust purification system can also perform the regeneration control by performing the combined rich control if the exhaust gas temperature is equal to or more than the lower limit temperature threshold for exhaust pipe injection during acceleration under the EGR rich control, or postpone the regeneration control if it is less than the lower limit temperature threshold.

Accordingly, the method can bypass the EGR rich control during acceleration during which the number of revolutions fluctuates, to thereby prevent the drivability (riding comfortability) from deteriorating. Also, the combined rich control can expand a regeneration controllable range even during acceleration while preventing the deterioration in drivability, and the generation of black smoke and white smoke.

The exhaust gas purification system to accomplish the above object comprises: a NOx occlusion reduction type catalyst that occludes NOx when an air/fuel ratio of exhaust gas is in a lean state, and releases and reduces occluded NOx when it is in a rich state; and a regeneration control device that performs regeneration control for recovering a NOx occluding ability of the NOx occlusion reduction type catalyst if it is determined that an estimated NOx occlusion amount that is estimated to be occluded in the NOx occlusion reduction type catalyst reaches a predetermined criterion value, wherein the regeneration control device is configured to perform control comprising: determining whether or not an engine operating condition is in a first engine operating region where an exhaust gas temperature becomes equal to or less than a predetermined mode determination temperature, and if the engine operating condition is in the first engine operating region, performing EGR rich control in which the air/fuel ratio of the exhaust gas is brought into the rich state by controlling an EGR amount, or if the engine operating condition is not in the first engine operating region, performing exhaust pipe injection rich control in which the air/fuel ratio of the exhaust gas is brought into the rich state by directly injecting fuel into an exhaust pipe; determining whether or not a vehicle mounted with the exhaust gas purification system is in acceleration if the EGR rich control is performed; and postponing the regeneration control until a determination that the vehicle is in acceleration is complete, if it is determined that the vehicle is in acceleration.

Also, in the above exhaust gas purification system, the regeneration control device is configured to perform the control further comprising: performing a combined rich control in which the EGR rich control and the exhaust pipe injection control are combined, if it is determined that the vehicle is in acceleration, a NOx conversion efficiency by the NOx occlusion reduction type catalyst is equal to or less than a predetermined conversion efficiency, and the exhaust gas temperature is equal to or more than a lower limit temperature threshold for exhaust pipe injection.

Alternatively, the exhaust gas purification system to accomplish the above object comprises: a NOx occlusion reduction type catalyst that occludes NOx when an air/fuel ratio of exhaust gas is in a lean state, and releases and reduces occluded NOx when it is in a rich condition; and a regeneration control device that performs regeneration control for recovering a NOx occluding ability of the NOx occlusion reduction type catalyst if it is determined that an estimated NOx occlusion amount that is estimated to be occluded in the NOx occlusion reduction type catalyst reaches a predetermined criterion value, wherein the regeneration control device may be configured to perform control comprising: determining whether or not an engine operating condition is in a first engine operating region where an exhaust gas temperature becomes equal to or less than a predetermined mode determination temperature, and if the engine operating condition is in the first engine operating region, performing EGR rich control in which the air/fuel ratio of the exhaust gas is brought into the rich state by controlling an EGR amount, or if the engine operating condition is not in the first engine operating region, performing exhaust pipe injection rich control in which the air/fuel ratio of the exhaust gas is brought into the rich state by directly injecting fuel into an exhaust pipe; determining whether or not a vehicle mounted with the exhaust gas purification system is in acceleration if the EGR rich control is performed; and performing a combined rich control in which the EGR rich control and the exhaust pipe injection rich control are combined, if it is determined that the vehicle is in acceleration, and the exhaust gas temperature is equal to or more than a lower limit temperature threshold for exhaust pipe injection, or postponing the regeneration control if it is determined that the vehicle is in acceleration, and the exhaust gas temperature is less than the lower limit temperature threshold for exhaust pipe injection.

The above regeneration control can be summarized as follows: During steady running at lower temperature (in the first engine operating region), the rich control is performed based on the EGR rich control. During acceleration at lower temperature, if the exhaust gas temperature is less than the lower limit temperature threshold, the EGR rich control is postponed, and the regeneration control is not performed. Also, during acceleration at lower temperature, if the exhaust gas temperature is equal to or more than the lower limit temperature threshold, the combined rich control is performed based on the EGR rich control and the exhaust pipe injection rich control under the condition that the target air-intake flow rate is increased. Further, during steady running at higher temperature, or during acceleration at higher temperature, the regeneration control is performed based on the exhaust pipe injection rich control.

Note that the air/fuel ratio of the exhaust gas herein refers not necessarily to an air/fuel ratio in the cylinder but to a ratio between an air amount and a fuel amount (including an amount of fuel that is combusted in the cylinder) supplied to the exhaust gas flowing into the NOx occlusion reduction type catalyst. In addition, a relationship between the air/fuel ratio (=air amount/fuel amount) and the air excess ratio is expressed by "air excess ratio=(air/fuel ratio/theoretical air/fuel ratio)".

As described above, the exhaust gas purification method and the exhaust gas purification system according to the present invention can prevent the drivability from deteriorating during acceleration as well as expanding the regeneration controllable range during acceleration while preventing the deterioration in drivability and the generation of black smoke and white smoke during acceleration, at the time of the rich control for regenerating the NOx occlusion reduction type catalyst, and therefore reduce a deterioration in NOx conversion efficiency.

DETAILED DESCRIPTION OF THE INVENTION

The exhaust gas purification method and the exhaust gas purification system in embodiments of the present invention will hereinafter be described with reference to the drawings.

Note that a rich state of exhaust gas herein does not necessarily require rich combustion in a cylinder, but refers to a condition where an ratio between an air amount and a fuel amount (including an amount of fuel combusted in the cylinder) supplied to the exhaust gas flowing into a NOx occlusion reduction type catalyst is close to a theoretical air/fuel ratio, or the fuel amount is larger (richer) than that in the theoretical air/fuel ratio.

Figure 1:
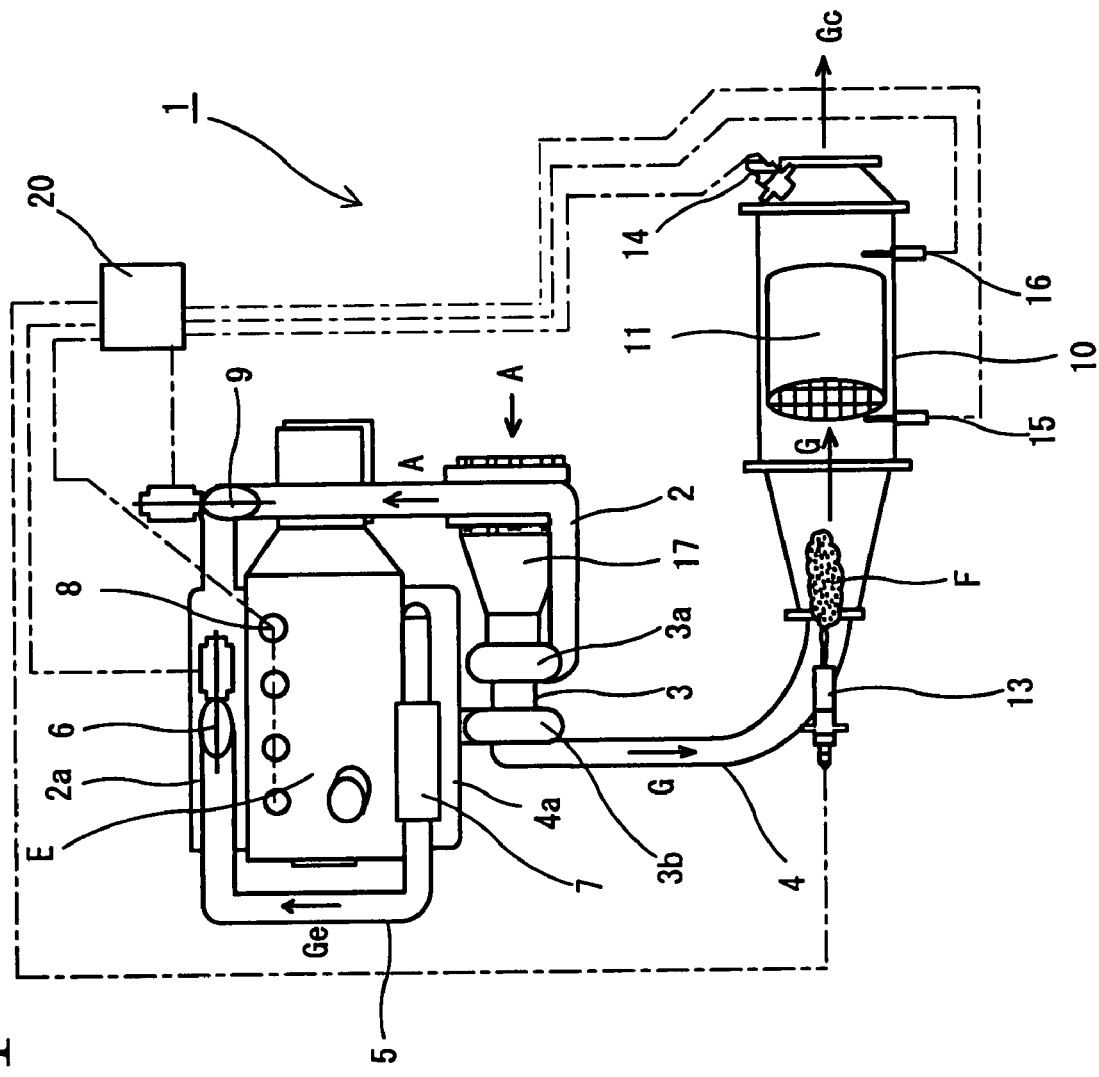
FIG. 1 is a diagram illustrating a configuration of the exhaust gas purification system according to an embodiment of the present invention.

FIG. 1 illustrates a configuration of an exhaust gas purification system 1 in the embodiments of the present invention. In the exhaust gas purification system 1, an exhaust gas purification device 10 having a NOx occlusion reduction type catalyst 11 is arranged in an exhaust passage 4 of an engine (internal combustion engine) E.

The NOx occlusion reduction type catalyst 11 is formed of a monolithic catalyst. A carrier such as aluminum oxide or titanium oxide is provided with a catalyst coat layer. The catalyst coat layer is made to carry a catalyst metal such as platinum (Pt) or palladium (Pd) or the like, and a NOx occlusion material (NOx occlusion substance) such as barium (Ba) or the like.

In the NOx occlusion reduction type catalyst 11, the NOx occlusion material occludes NOx in exhaust gas in an exhaust gas condition where oxygen concentration is higher (lean air/fuel ratio state), to thereby purify the NOx in the exhaust gas, whereas in a condition where the oxygen concentration is lower or zero, the occluded NOx is released and the released NOx is reduced with the aid of a catalytic action of the catalyst metal to thereby prevent the NOx from flowing out to the atmosphere.

Also, a λ sensor (air excess ratio sensor) 14 is arranged on a downstream side of the NOx occlusion reduction type catalyst 11. Further, in order to measure a temperature of the NOx occlusion reduction type catalyst 11, an upstream side temperature sensor 15 and a downstream side temperature sensor 16 are arranged on an upstream side and the downstream side of, i.e., in front of and at the rear of the NOx occlusion reduction type catalyst 11, respectively. Based on a difference in temperature between the temperature sensors 15 and 16 placed in the two positions, a temperature difference within the catalyst 11 is estimated.

Further, an HC supply valve (injector for fuel injection) 13 for supplying carbon hydride (HC) F; which is to be a reducing agent for NOx, is provided in the exhaust passage 4 on the upstream side of the NOx occlusion reduction type catalyst 11. The HC supply valve 13 is to be a means for the exhaust pipe injection rich control. The HC supply valve 13 directly injects the carbon hydride (HC) F such as light oil, which is fuel for the engine, from an un-illustrated fuel tank into the exhaust passage 4 to bring an air/fuel ratio of the exhaust gas G into a lean state, a rich state, or a stoichiometric condition (theoretical air/fuel ratio condition).

Further, there is provided a control unit (ECU: engine control unit) 20 for performing control of an operation on the whole of the engine E as well as recovery control for a NOx purification ability of the NOx occlusion reduction type catalyst 11. To the control unit 20, values detected by the λ sensor 14, the upstream side temperature sensor 15, the downstream side temperature sensor 16, and the like are input. Also, from the control unit 20, signals for controlling the EGR valve 6 of the engine E, a fuel injection valve 8 of a common-rail electronically-controlled fuel injection device for fuel injection, an air-intake throttle valve 9, and the like are output.

In the exhaust gas purification system 1, air A and the exhaust gas G flow as follows: The air A passes through a mass air flow sensor (MAF sensor) 17 and a compressor 3a of a turbocharger 3, in an air-intake passage 2. Then, the air A enters a cylinder through an air-intake manifold 2a after an amount of the air A has been adjusted with the air-intake throttle valve 9. On the other hand, the exhaust gas G generated in the cylinder exits from an exhaust manifold 4a to the exhaust passage 4 and drives a turbine 3b of the turbocharger 3. Subsequently, the exhaust gas G passes through the exhaust gas purification device 10 and is exhausted into the atmosphere through an un-illustrated silencer as purified exhaust gas Gc. The exhaust gas G also partially passes through an EGR cooler 7 in an EGR passage 5 as EGR gas Ge, and then is re-circulated into the air-intake manifold 2a after its amount has been adjusted with the EGR valve 6.

Meanwhile, a control unit for the exhaust gas purification system 1 is incorporated into the control unit 20 for the engine E, and controls the exhaust gas purification system 1 in tandem with operation control of the engine E. The control unit for the exhaust gas purification system 1 controls the exhaust gas purification system, including NOx regeneration control, and desulphurization and regeneration control of the NOx occlusion reduction type catalyst 11.

In the regeneration control, EGR rich control in an air-intake system and the exhaust pipe injection rich control in a fuel system are both employed to control an air/fuel ratio of the exhaust gas so as to bring it into a rich state (including a stoichiometric air/fuel ratio (theoretical air/fuel ratio)). In the EGR rich control, the EGR valve 6 and the air-intake valve 9 are controlled to increase an EGR amount, and thereby the air/fuel ratio of the exhaust gas is reduced. As the EGR rich control, there is used control in which by opening the EGR valve 6 and performing air-intake throttling for controlling the air-intake valve 9, a more amount of EGR gas is taken in. On the other hand, in the exhaust pipe injection rich control, by directly supplying HC into the exhaust passage 4 with use of the HC supply valve 13 to add the fuel to the exhaust gas, the air/fuel ratio of the exhaust gas is reduced.

These types of rich control bring the exhaust gas into a predetermined air/fuel ratio condition (approximately 0.8 to 1.0 in terms of an air excess ratio (λ), although depending on the catalyst) as well as setting the exhaust gas within a predetermined temperature range (approximately 300° C. to 600° C., although depending on the catalyst). This allows the NOx occluding ability, i.e., the NOx purification ability to be recovered to thereby regenerate the NOx catalyst.

Figure 2:
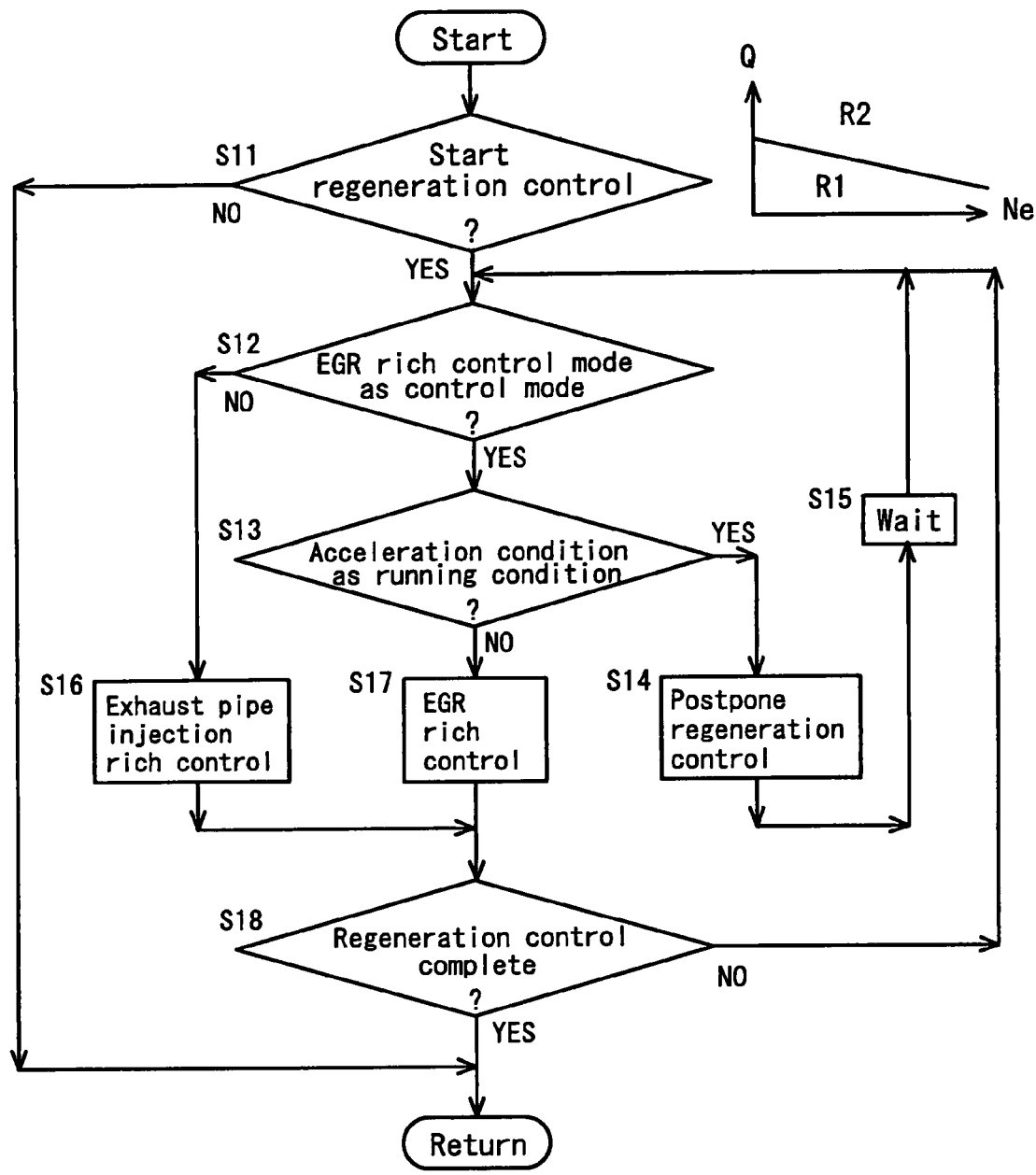
FIG. 2 is a diagram illustrating a regeneration control flow for the NOx occlusion reduction type catalyst according to a first embodiment.
Figure 3:
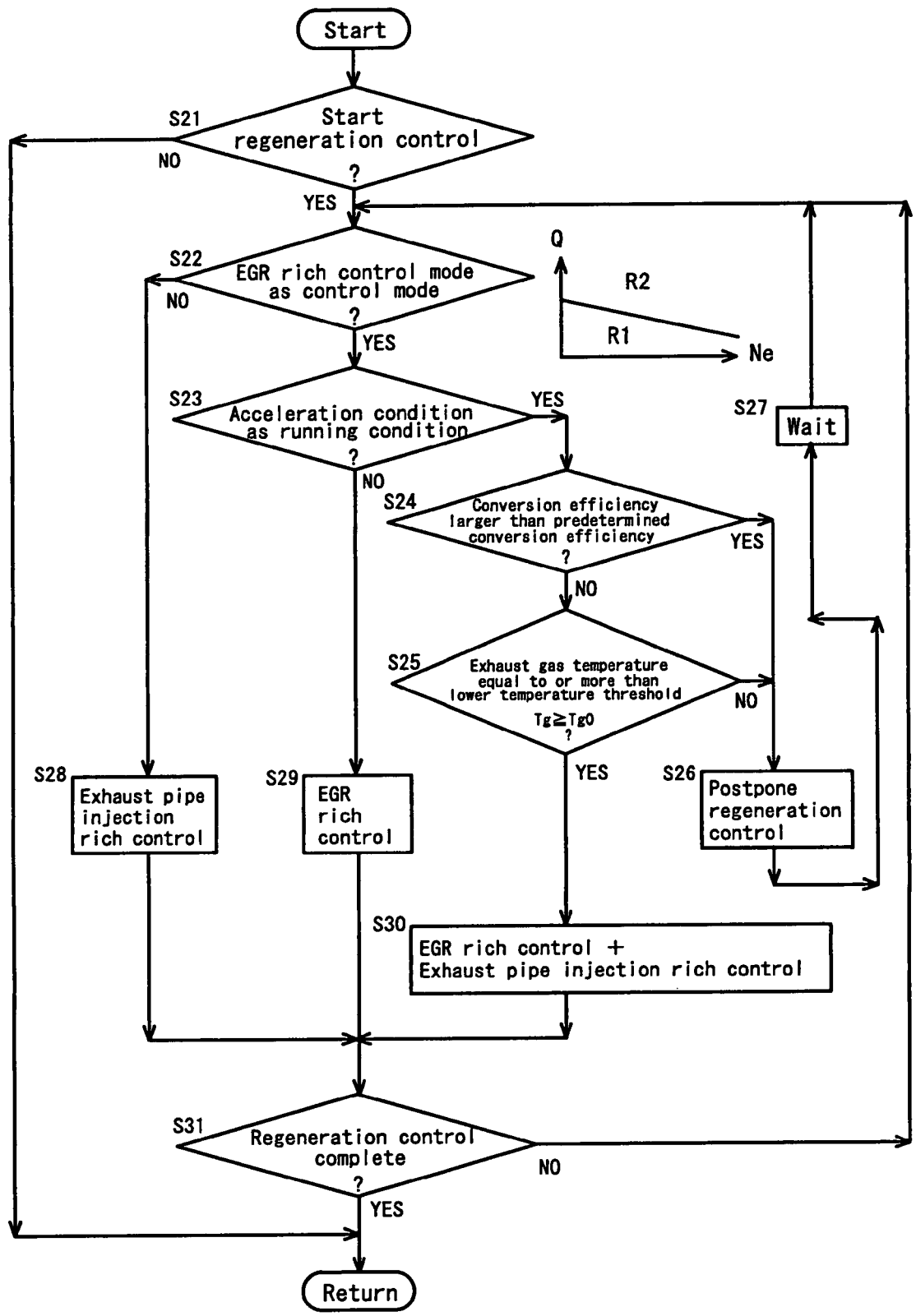
FIG. 3 is a diagram illustrating a regeneration control flow for the NOx occlusion reduction type catalyst according to a second embodiment.
Figure 4:
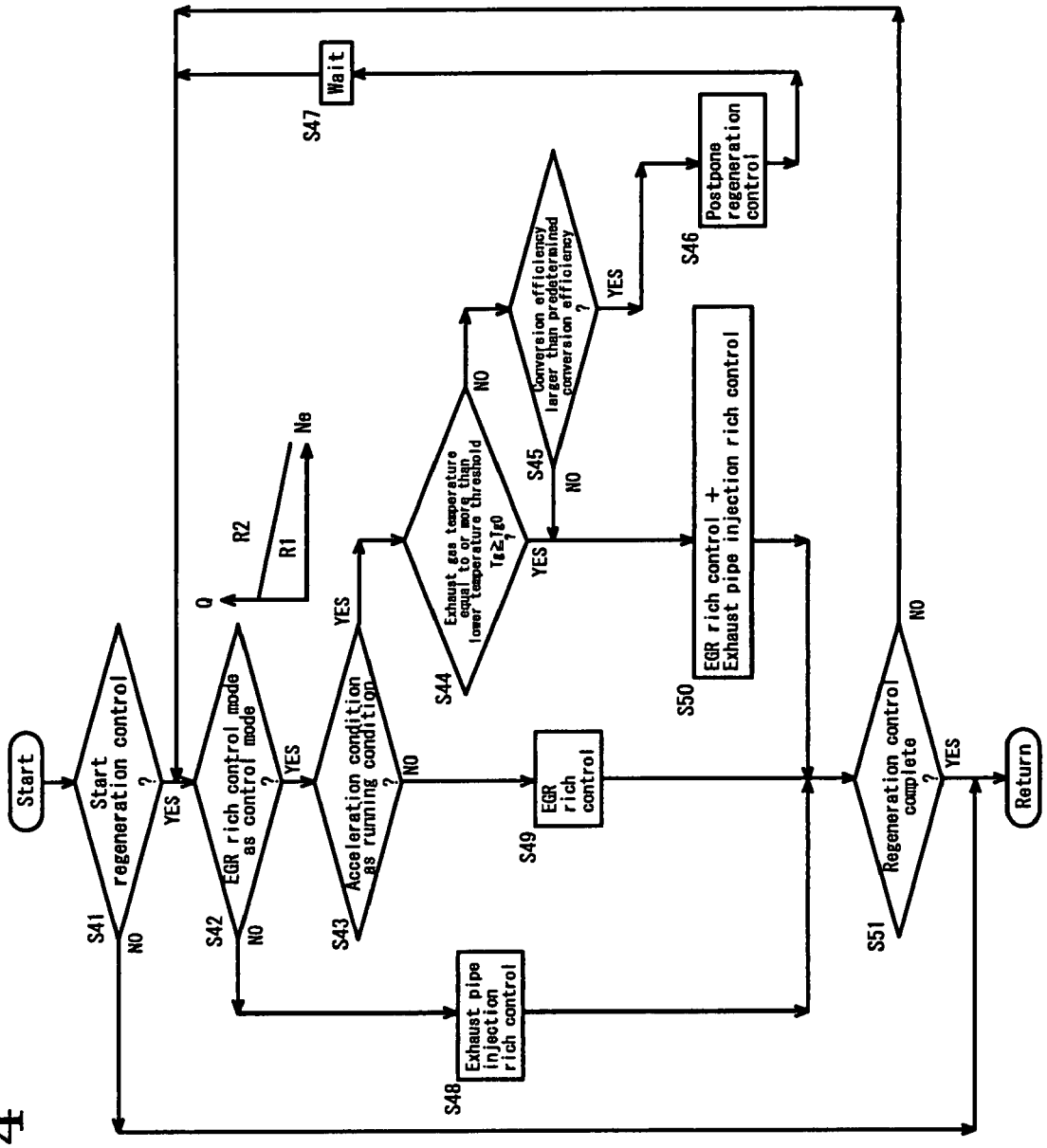
FIG. 4 is a diagram illustrating a regeneration control flow for the NOx occlusion reduction type catalyst according to a third embodiment.
Figure 5:
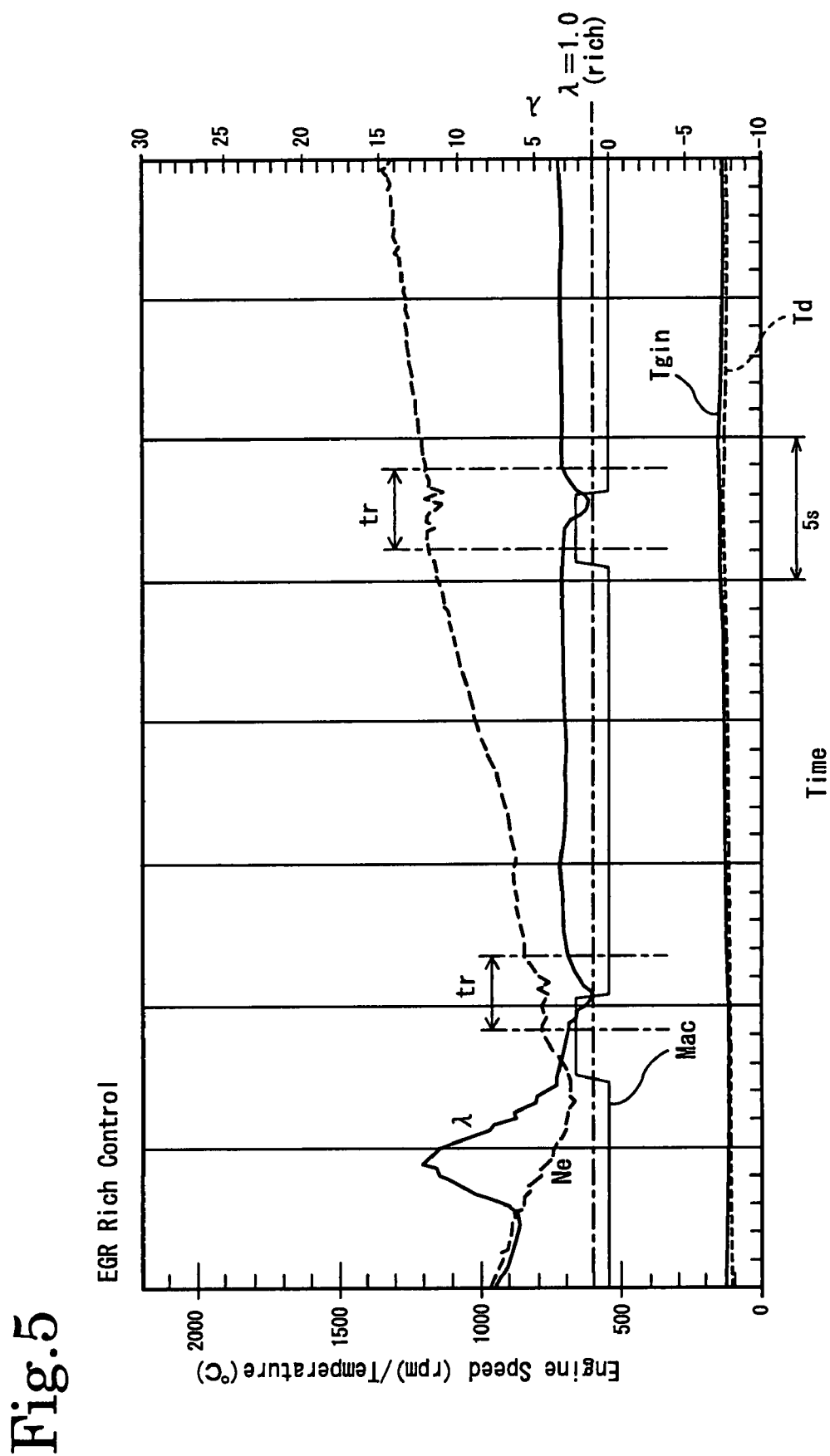
FIG. 5 is a time sequence diagram illustrating the engine speed, the air/fuel ratio, and the like in the EGR rich control.
Figure 6:
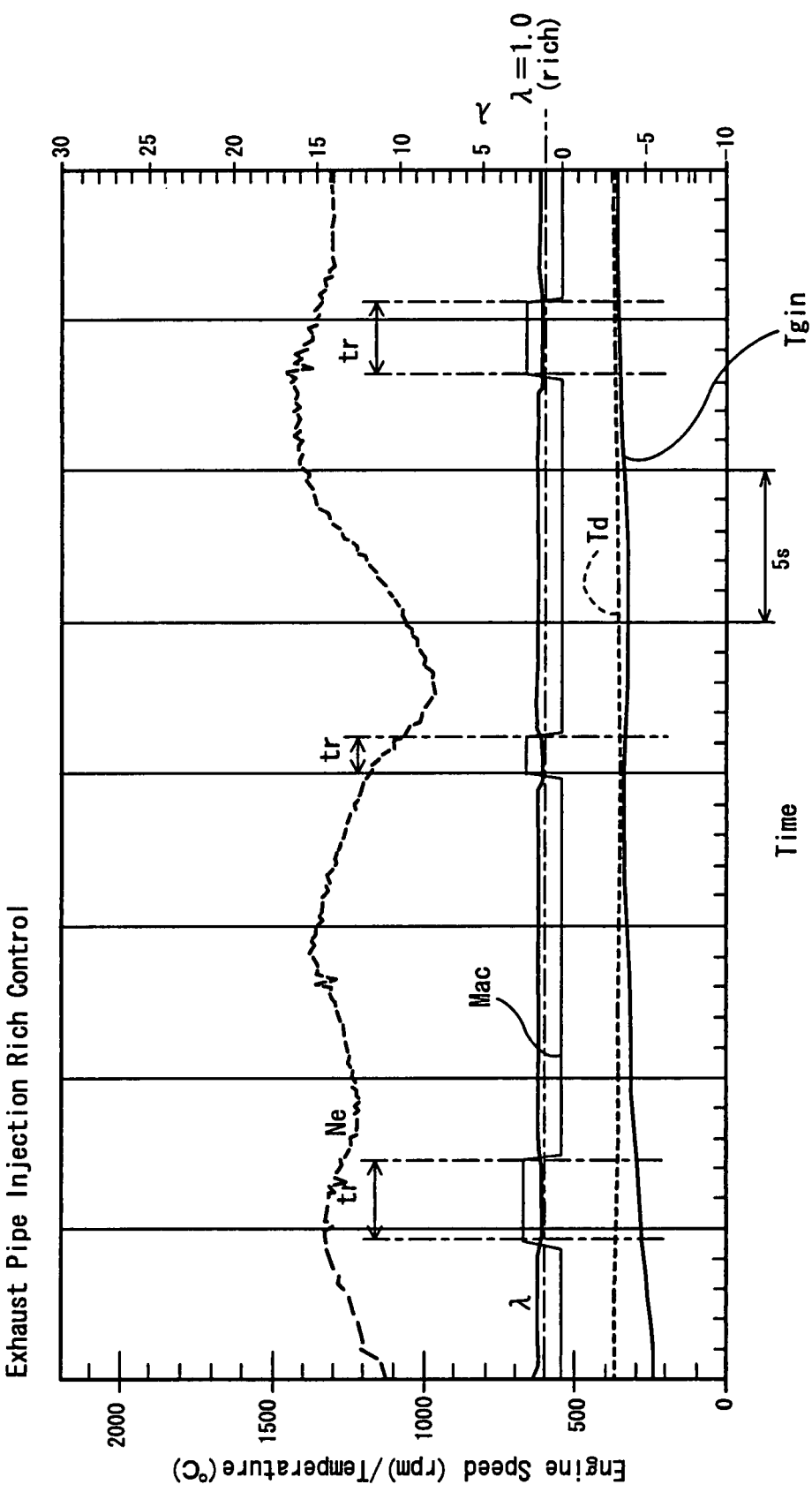
FIG. 6 is a diagram illustrating a relationship between the engine speed and the air/fuel ratio in the exhaust pipe injection rich control.

The present invention is configured to perform the following control: When the engine speed Ne and the load Q representing an engine operating condition are in a first engine operating region R1 as shown in FIGS. 2 to 4, the EGR rich control in which fuel efficiency is not deteriorated and black smoke is less degraded is performed. In the first engine operating region R1, an exhaust temperature Tg becomes equal to or less than a predetermined mode determination temperature Tgm (e.g., 300° C.). On the other hand, when the engine speed Ne and the load Q are in a second engine operating region R2, the exhaust pipe injection rich control in which the problem of oil dilution does not arise and black smoke is not degraded is performed. In the second engine operating region R2, the exhaust temperature Tg exceeds the predetermined temperature Tgm (e.g., 300° C.).

Also, in the exhaust gas purification system 1, the control unit for the exhaust gas purification system 1 incorporated in the control unit 20 for the engine E performs the regeneration control of the NOx occlusion reduction type catalyst 11 according to any of regeneration control flows exemplified in FIGS. 2 to 4. Note that the regeneration control flows illustrated in FIGS. 2 to 4 are respectively performed in tandem with other control flows for the engine E during operation of the engine E.

In a first embodiment of the present invention, the regeneration control as exemplified in the regeneration control flow of FIG. 2 is performed. In the regeneration control flow of FIG. 2, after the control flow has been called to start, it is determined in step S11 whether or not the regeneration control can be started. If it is determined in step S11 that the regeneration control cannot be started, the flow returns.

The determination of the start of the regeneration control is made such that, for example, the regeneration can be started if a NOx cumulative value ΣNOx exceeds a predetermined criterion value Cn. The NOx cumulative value ΣNOx is obtained by cumulatively calculating a NOx exhaust amount per unit time ΔNOx based on an operating condition of the engine E. Alternatively, it may be determined to start the regeneration of the NOx catalyst if a NOx conversion efficiency becomes less than a predetermined criterion value. The NOx conversion efficiency is calculated based on NOx concentrations on the upstream and downstream sides of the NOx occlusion reduction type catalyst 11. In other words, the regeneration control for recovering the NOx occluding ability of the NOx occlusion reduction type catalyst 11 is performed if it is determined that an estimated NOx occlusion amount, which is estimated to be occluded in the NOx occlusion reduction type catalyst 11, reaches a predetermined criterion value.

If it is determined in step S11 that the regeneration control can be started, it is determined in step S12 whether the rich control is in the EGR rich control mode or the exhaust pipe injection rich control mode. This determination is made based on whether or not an operating condition (engine speed Ne and load Q) of the engine is in the region where the exhaust gas temperature Tg becomes equal to or less than the predetermined mode determination temperature Tgm (e.g., 300° C.). In other words, if the detected engine speed Ne and load Q are in the EGR rich control region (first engine operating region) R1, the rich control is in the EGR rich control mode. On the other hand, if the detected engine speed Ne and load Q are in the exhaust pipe injection rich control region (second engine operating region) R2, the rich control is in the exhaust pipe injection rich control mode. That is, one of the modes is determined. If the engine speed Ne and the load Q are in the EGR rich control region R1, an exhaust gas temperature obtained from the engine speed Ne and the load Q with reference to map data for starting the regeneration, which has been preliminarily input, becomes equal to or less than the predetermined mode determination temperature. On the other hand, if the engine speed Ne and the load Q are in the exhaust pipe injection rich control region R2, the exhaust gas temperature obtained from the engine speed Ne and the load Q exceeds the predetermined mode determination temperature Tgm.

Then, if it is determined in step S12 that Ne and Q are in the exhaust pipe injection rich control region R2, the exhaust pipe injection rich control is performed for a predetermined time period in step S16, and then the flow proceeds to step S18.

On the other hand, if it is determined in step S12 that Ne and Q are in the EGR rich control region R1, it is determined in step S13 whether or not a running condition is an acceleration condition. If it is determined in step S13 that the running condition is a steady running condition or a deceleration condition rather than the acceleration condition, the EGR rich control is performed for a predetermined time period in step S17, and then the flow proceeds to step S18.

This determination of acceleration, i.e., the determination whether or not the vehicle mounted with the exhaust gas purification system is in acceleration is made based on an increasing amount of a fuel flow rate per unit time ΔQ, an accelerator pedaling acceleration Δα, a rise in the engine speed ΔNe, a rise in catalyst temperature ΔTd, etc. For example, if any of them exceeds a corresponding predetermined range, it is determined that the running condition is the acceleration condition.

If it is determined in step S13 that the running condition is the acceleration condition, the flow proceeds to step S14, where the regeneration control is postponed. Then, in the next step S15, the flow waits for a predetermined time period until the next determination can be started, and then returns to step S12. The flow waits until the regeneration control can be performed in the exhaust pipe injection rich control mode in step S16 after the rich control mode has been switched to the exhaust pipe injection rich control mode by an increase in exhaust gas temperature Tg, or in the EGR rich control mode in step S17 after the running condition of the vehicle has gotten out of the acceleration condition.

Subsequently, in step S18, it is determined whether or not the regeneration control can be terminated, and if it is determined that the regeneration control can be terminated, the regeneration control is terminated, and the flow returns. On the other hand, if it is determined in step S18 that the regeneration control should not be terminated, the flow returns to step S12, and then the regeneration control is repeated.

The termination of the regeneration control is determined based on whether or not a predetermined regeneration time has elapsed, or whether or not the NOx conversion efficiency has been increased to a predetermined conversion efficiency for the termination of the regeneration control, or another factor.

The regeneration control flow in FIG. 2 enables the following regeneration control to be performed: In step S12, it is determined whether the engine operating condition is in the first engine operating region R1 or in the second engine operating region R2. If the engine operating condition is in the first engine operating region R1, the rich control mode is set to the EGR rich control mode in which the air/fuel ratio of the exhaust gas is brought into the rich condition by controlling an EGR amount. On the other hand, if the engine operating condition is in the second engine operating region R2, the rich control mode is set to the exhaust pipe injection rich control mode in which the air/fuel ratio of the exhaust gas is brought into the rich condition by directly injecting the fuel into the exhaust pipe.

In a case of the EGR rich control mode, it is determined in step S13 whether or not the vehicle mounted with the exhaust gas purification system is in acceleration. If it is determined in this determination step that the vehicle is in acceleration, the regeneration control is postponed (including a suspension during the regeneration control) until the determination that the vehicle is in acceleration is complete.

A second embodiment is now described. In the second embodiment, the regeneration control illustrated in the regeneration control flow of FIG. 3 is performed. In the regeneration control flow of FIG. 3, after the control flow has been called to start, it is determined in step S21 whether or not the regeneration control can be started. If it is determined in this determination step that the regeneration control cannot be started, the flow returns. On the other hand, if it is determined in this determination step that the regeneration control can be started, it is determined in step S22 whether the rich control is in the EGR rich control mode or the exhaust pipe injection rich control mode.

If it is determined in step S22 that Ne and Q are not in the EGR rich control region (first engine operating region) R1 but in the exhaust pipe injection rich control region (second engine operating region) R2, i.e., if the rich control mode is the exhaust pipe injection rich control mode, the exhaust pipe injection rich control is performed for a predetermined time period in step S28, and then the flow proceeds to step S31.

On the other hand, if it is determined in step S22 that Ne and Q are in the EGR rich control region R1, i.e., if the rich control mode is the EGR rich control mode, it is determined in step S23 whether or not a running condition is an acceleration condition. If it is determined in step S23 that the running condition is not the acceleration condition but a steady running condition or a deceleration condition, the EGR rich control is performed for a predetermined time period in step S29, and then the flow proceeds to step S31.

If it is determined in step S23 that the running condition is the acceleration condition, the flow proceeds to step S24. In step S24, it is determined whether or not the NOx conversion efficiency by the NOx occlusion reduction type catalyst 11 is larger than a predetermined conversion efficiency. If it is determined in step S24 that the NOx conversion efficiency is larger than the predetermined conversion efficiency, there is plenty of time for the NOx occluding ability to be saturated, so that the flow proceeds to step S26. In step S26, the regeneration control is postponed, and the flow waits for a predetermined control time period in step S27 until the next determination can be started. Then, the flow returns to step S22.

On the other hand, if it is determined in step S24 that the NOx conversion efficiency is equal to or less than the predetermined conversion efficiency, it is determined in step S25 whether or not the exhaust gas temperature Tg is equal to or more than a lower limit temperature threshold Tg0 (e.g., 200° C.) for exhaust pipe injection. If it is determined in step S25 that Tg is equal to or more than the lower limit temperature threshold Tg0, a combined rich control is performed in step S30, in which the EGR rich control and the exhaust pipe injection rich control are combined. After the combined rich control has been performed for a predetermined time period in step S30, the flow proceeds to step S31.

In the combined rich control in step S30, a target air-intake flow rate is set to a value higher than that in the normal rich control mode, to the extent that black smoke is not degraded and any problem in acceleration does not arise. This can prevent white smoke due to unburned HC emission from being generated. However, the rich air/fuel ratio cannot be attained only by this, so that by performing the exhaust pipe injection rich control in tandem, the rich air/fuel ratio is attained. In the exhaust pipe injection rich control, the injection is made not into the cylinder but into the exhaust pipe, so that an amount of black smoke is not increased. Also, the EGR rich control allows the air/fuel ratio of the exhaust gas to be reduced, so that the exhaust pipe injection requires only a smaller fuel injection amount. For this reason, the white smoke due to HC is not generated.

Further, if it is determined in step S25 that Tg is less than the lower limit temperature threshold Tg0, the flow proceeds to step S26. In step S26, the regeneration control is postponed (including a suspension during the regeneration control), and the flow waits for the predetermined control time period in step S27 until the next determination can be started. Then, the flow returns to step S22 to wait until the regeneration control can be started.

Subsequently, in step S31, it is determined whether or not the regeneration control can be terminate. If it is determined in step S31 that the regeneration control can be terminated, the regeneration control is terminated, and the flow returns. On the other hand, if it is determined that the regeneration control should not be terminated, the flow returns to step S22, and then the regeneration control is repeated.

In the repeated control, the flow waits until any of the following three conditions is met and the regeneration control can be started: Firstly, under the condition that the exhaust gas temperature has been elevated and the rich control mode has been set to the exhaust pipe injection rich control mode, the regeneration control is performed in the exhaust pipe injection rich control mode in step S28. Secondly, under the condition that the running condition of the vehicle has gotten out of the acceleration condition, the regeneration control is performed in the EGR rich control mode in step S29. Thirdly, under the condition that the conversion efficiency has been equal to or less than the predetermined conversion efficiency, and the exhaust gas temperature Tg has been equal to or more than the lower limit temperature threshold Tg0, the regeneration control is performed in the combined rich control mode in step S30.

The regeneration control flow in FIG. 3 enables the following control to be performed. In step S22, it is determined whether the rich control is in the EGR rich control mode in which the air/fuel ratio of the exhaust gas is brought into the rich condition by controlling the EGR amount, or in the exhaust pipe injection rich control mode in which the air/fuel ratio of the exhaust gas is brought into the rich condition by directly injecting the fuel into the exhaust pipe.

In a case of the EGR rich control mode, it is determined in step S23 whether or not the vehicle mounted with the exhaust gas purification system is in acceleration. If it is determined in this determination step that the vehicle is in acceleration, and also if it is determined in step S24 that the NOx conversion efficiency by the NOx occlusion reduction type catalyst 11 is equal to or less than the predetermined conversion efficiency, and further if it is determined in step S25 that the exhaust gas temperature Tg is equal to or more than the lower limit temperature threshold Tg0 for the exhaust pipe injection, the rich control in which the EGR rich control and the exhaust pipe injection rich control are combined is performed in step S30.

A third embodiment is now described. In the third embodiment, the regeneration control illustrated in the regeneration control flow of FIG. 4 is performed. In the regeneration control flow of FIG. 4, after the control flow has been called to start, it is determined in step S41 whether or not the regeneration control can be started. If it is determined in the determination step that the regeneration control cannot be started, the flow returns. On the other hand, if it is determined that the regeneration control can be started, it is determined in step S42 whether or not the rich control mode is the EGR rich control mode or the exhaust pipe injection control mode.

If it is determined in step S42 that the engine operating condition is not in the EGR rich control region (first engine operating region) R1 but in the exhaust pipe injection rich control region (second engine operating region) R2, the exhaust pipe injection rich control is performed for a predetermined time period in step S48, and then the flow proceeds to step S51.

On the other hand, if it is determined in step S42 that the engine operating condition is in the EGR rich control region R1, it is determined in step S43 whether or not a running condition is an acceleration condition. If it is determined in step S43 that the running condition is not the acceleration condition but a steady running condition or a deceleration condition, the EGR rich control is performed for a predetermined time period in step S49, and then the flow proceeds to step S51.

If it is determined in step S43 that the running condition is the acceleration condition, the flow proceeds to step S44. In step S44, it is determined whether or not the exhaust gas temperature Tg is equal to or more than the lower limit temperature threshold Tg0 (e.g., 200° C.) for the exhaust pipe injection. If it is determined that Tg is equal to or more than the lower limit temperature threshold Tg0, the combined rich control in which the EGR rich control and the exhaust pipe injection rich control are combined is performed for a predetermined time period in step S50, and then the flow proceeds to step S51.

On the other hand, if it is determined in step S44 that the exhaust gas temperature Tg is less than the lower limit temperature threshold Tg0, the flow proceeds to step S45. In step S45, it is determined whether or not the NOx conversion efficiency by the NOx occlusion reduction type catalyst 11 is larger than a predetermined conversion efficiency. If it is determined that the NOx conversion efficiency is larger than the predetermined conversion efficiency, the flow proceeds to step S46, where the regeneration control is postponed (including a suspension during the regeneration control). Then, the flow waits for a predetermined control time period in step S47 until the next determination can be started, and then returns to step S42.

If it is determined in step S45 that the NOx conversion efficiency is equal to or less than the predetermined conversion efficiency, the combined rich control in step 50 is performed. After the combined rich control has been performed for the predetermined time period, the flow proceeds to step S51.

In step S51, it is determined whether or not the regeneration control can be terminated. If it is determined that the regeneration control can be terminated, the regeneration control is terminated, and the flow returns. On the other hand, if it is determined that the regeneration control should not be terminated, the flow returns to step S42, and then the regeneration control is repeated.

In the repeated control, the flow waits until any of the following three types of regeneration control can be started: Firstly, under the condition that the exhaust gas temperature has been elevated and the rich control mode has been set to the exhaust pipe injection rich control mode, the regeneration control is performed in the exhaust pipe injection rich control mode in step S48. Secondly, under the condition that the running condition of the vehicle has gotten out of the acceleration condition, the regeneration control is performed in the EGR rich control mode in step S49. Thirdly, under the condition that the exhaust gas temperature Tg has been equal to or more than the lower limit temperature threshold Tg0 in step S44, or the conversion efficiency has been equal to or less than the predetermined conversion efficiency in step S45, the regeneration control is performed in the combined rich control mode in step S50.

The regeneration control flow in FIG. 4 allows the following control to be performed. In step S42, it is determined whether the rich control is in the EGR rich control mode in which the air/fuel ratio of the exhaust gas is brought into the rich condition by controlling the EGR amount, or in the exhaust pipe injection rich control mode in which the air/fuel ratio of the exhaust gas is brought into the rich condition by directly injecting the fuel into the exhaust pipe. If it is determined in the determination step that the rich control is in the EGR rich control mode, it is determined in step S43 whether or not the vehicle mounted with the exhaust gas purification system 1 is in acceleration. If it is determined in the determination step that the vehicle is in acceleration, and also if it is determined in step S44 that the exhaust gas temperature Tg is equal to or more than the lower limit temperature threshold Tg0 for the exhaust pipe injection, the rich control in which the EGR rich control and the exhaust pipe injection rich control are combined is performed in step S50.

Thus, at the time of the rich control for regenerating the NOx occlusion reduction type catalyst in the EGR rich control mode, the exhaust gas purification method and the exhaust gas purification system can expand the regeneration controllable engine operating region to thereby reduce a deterioration in the conversion efficiency while preventing drivability from deteriorating during acceleration, by postponing the EGR rich control or performing the combined rich control when the acceleration condition is entered.

INDUSTRIAL APPLICABILITY

The exhaust gas purification method and the exhaust gas purification system of the present invention, having the above-described excellent effects, can be highly effectively utilized as an exhaust gas purification method and an exhaust gas purification system for exhaust gas from an internal combustion engine mounted on a vehicle.

What is claimed is:

1. An exhaust gas purification method comprising: in regeneration control of an exhaust gas purification system that comprises a NOx occlusion reduction type catalyst that occludes NOx when an air/fuel ratio of exhaust gas is in a lean state, and releases and reduces the occluded NOx when it is in a rich state, and performs the regeneration control for recovering a NOx occluding ability of the NOx occlusion reduction type catalyst if it is determined that an estimated NOx occlusion amount that is estimated to be occluded in the NOx occlusion reduction type catalyst reaches a predetermined criterion value, the method comprising the steps of;
    determining whether or not an engine operating condition is in a first engine operating region where an exhaust gas temperature becomes equal to or less than a predetermined mode determination temperature,
    if the engine operating condition is in the first engine operating region, performing EGR rich control in which the air/fuel ratio of the exhaust gas is brought into the rich state by controlling an EGR amount,
    or if the engine operating condition is not in the first engine operating region, performing exhaust pipe injection rich control in which the air/fuel ratio of the exhaust gas is brought into the rich state by directly injecting fuel into an exhaust pipe;
    determining whether or not a vehicle mounted with the exhaust gas purification system is in acceleration if the EGR rich control is performed; and
    postponing the regeneration control until a determination that the vehicle is in acceleration is complete, if it is determined that the vehicle is in acceleration.

2. The exhaust gas purification method according to claim 1, further comprising: performing a combined rich control in which the EGR rich control and the exhaust pipe injection rich control are combined, if it is determined that the vehicle is in acceleration, a NOx conversion efficiency by the NOx occlusion reduction type catalyst is equal to or less than a predetermined conversion efficiency, and the exhaust gas temperature is equal to or more than a lower limit temperature threshold for exhaust pipe injection.

3. An exhaust gas purification method comprising: in regeneration control of an exhaust gas purification system that comprises a NOx occlusion reduction type catalyst that occludes NOx when an air/fuel ratio of exhaust gas is in a lean state, and releases and reduces the occluded NOx when it is in a rich state, and performs the regeneration control for recovering a NOx occluding ability of the NOx occlusion reduction type catalyst if it is determined that an estimated NOx occlusion amount that is estimated to be occluded in the NOx occlusion reduction type catalyst reaches a predetermined criterion value, the method comprising the steps of;
    determining whether or not an engine operating condition is in a first engine operating region where an exhaust gas temperature becomes equal to or less than a predetermined mode determination temperature,
    if the engine operating condition is in the first engine operating region, performing EGR rich control in which the air/fuel ratio of the exhaust gas is brought into the rich state by controlling an EGR amount,
    or if the engine operating condition is not in the first engine operating region, performing exhaust pipe injection rich control in which the air/fuel ratio of the exhaust gas is brought into the rich state by directly injecting fuel into an exhaust pipe;
    determining whether or not a vehicle mounted with the exhaust gas purification system is in acceleration if the EGR rich control is performed; and
    performing a combined rich control in which the EGR rich control and the exhaust pipe injection rich control are combined, if it is determined that the vehicle is in acceleration, and the exhaust gas temperature is equal to or more than a lower limit temperature threshold for exhaust pipe injection, or postponing the regeneration control, if it is determined that the vehicle is in acceleration, and the exhaust gas temperature is less than the lower limit temperature threshold for exhaust pipe injection.

4. An exhaust gas purification system comprising: a NOx occlusion reduction type catalyst that occludes NOx when an air/fuel ratio of exhaust gas is in a lean state, and releases and reduces the occluded NOx when it is in a rich state; and a regeneration control device that performs regeneration control for recovering a NOx occluding ability of the NOx occlusion reduction type catalyst if it is determined that an estimated NOx occlusion amount that is estimated to be occluded in the NOx occlusion reduction type catalyst reaches a predetermined criterion value, wherein the regeneration control device performs control comprising:

determining whether or not an engine operating condition is in a first engine operating region where an exhaust gas temperature becomes equal to or less than a predetermined mode determination temperature, if the engine operating condition is in the first engine operating region, performing EGR rich control in which the air/fuel ratio of the exhaust gas is brought into the rich state by controlling an EGR amount, or if the engine operating condition is not in the first engine operating region, performing exhaust pipe injection rich control in which the air/fuel ratio of the exhaust gas is brought into the rich state by directly injecting fuel into an exhaust pipe;

determining whether or not a vehicle mounted with the exhaust gas purification system is in acceleration if the EGR rich control is performed; and postponing the regeneration control until a determination that the vehicle is in acceleration is complete, if it is determined that the vehicle is in acceleration.

5. The exhaust gas purification system according to claim 4, wherein the regeneration control device performs the control further comprising: performing a combined rich control in which the EGR rich control and the exhaust pipe injection rich control are combined when a NOx conversion efficiency by the NOx occlusion reduction type catalyst is equal to or less than a predetermined conversion efficiency, and the exhaust gas temperature is equal to or more than a lower limit temperature threshold for exhaust pipe injection, if it is determined that the vehicle is in acceleration.

6. An exhaust gas purification system comprising: a NOx occlusion reduction type catalyst that occludes NOx when an air/fuel ratio of exhaust gas is in a lean state, and releases and reduces the occluded NOx when it is in a rich state; and a regeneration control device that performs regeneration control for recovering a NOx occluding ability of the NOx occlusion reduction type catalyst if it is determined that an estimated NOx occlusion amount that is estimated to be occluded in the NOx occlusion reduction type catalyst reaches a predetermined criterion value, wherein the regeneration control device performs control comprising:

determining whether or not an engine operating condition is in a first engine operating region where an exhaust gas temperature becomes equal to or less than a predetermined mode determination temperature, if the engine operating condition is in the first engine operating region, performing EGR rich control in which the air/fuel ratio of the exhaust gas is brought into the rich state by controlling an EGR amount, or if the engine operating condition is not in the first engine operating region, performing exhaust pipe injection rich control in which the air/fuel ratio of the exhaust gas is brought into the rich state by directly injecting fuel into an exhaust pipe;

determining whether or not a vehicle mounted with the exhaust gas purification system is in acceleration if the EGR rich control is performed; and performing a combined rich control in which the EGR rich control and the exhaust pipe injection rich control are combined, if it is determined that the vehicle is in acceleration, and the exhaust gas temperature is equal to or more than a lower limit temperature threshold for exhaust pipe injection, or postponing the regeneration control if it is determined that the vehicle is in acceleration, and the exhaust gas temperature is less than the lower limit temperature threshold for exhaust pipe injection.

* * * * *